US007152170B2

(12) United States Patent
Park

(10) Patent No.: US 7,152,170 B2
(45) Date of Patent: Dec. 19, 2006

(54) SIMULTANEOUS MULTI-THREADING PROCESSOR CIRCUITS AND COMPUTER PROGRAM PRODUCTS CONFIGURED TO OPERATE AT DIFFERENT PERFORMANCE LEVELS BASED ON A NUMBER OF OPERATING THREADS AND METHODS OF OPERATING

(75) Inventor: Gi-ho Park, Seoul (KR)

(73) Assignee: Samsung Electronics Co., Ltd. (KR)

( * ) Notice: Subject to any disclaimer, the term of this patent is extended or adjusted under 35 U.S.C. 154(b) by 511 days.

(21) Appl. No.: 10/631,601

(22) Filed: Jul. 31, 2003

(65) Prior Publication Data

US 2004/0168039 A1    Aug. 26, 2004

(30) Foreign Application Priority Data

Feb. 20, 2003   (KR)   ............... 10-2003-0010759

(51) Int. Cl.
*G06F 1/26* (2006.01)
*G06F 1/32* (2006.01)

(52) U.S. Cl. ............... 713/320; 713/300; 713/320; 713/324; 700/32; 700/108; 700/174; 717/119; 717/149; 712/235

(58) Field of Classification Search ............... 713/300, 713/322, 323, 324, 320, 3, 24; 712/1, 15, 712/20, 2, 235; 700/1, 21, 32, 108, 174; 714/47, 722; 717/119, 149
See application file for complete search history.

(56) References Cited

U.S. PATENT DOCUMENTS

| 5,717,892 A |   | 2/1998 | Oldfield ............... 395/455 |
|---|---|---|---|
| 5,752,031 A | * | 5/1998 | Cutler et al. ............... 718/103 |
| 5,835,705 A | * | 11/1998 | Larsen et al. ............... 714/47 |
| 5,870,616 A | * | 2/1999 | Loper et al. ............... 713/324 |
| 6,073,159 A | * | 6/2000 | Emer et al. ............... 718/103 |
| 6,079,025 A |   | 6/2000 | Fung ............... 713/323 |
| 6,092,175 A | * | 7/2000 | Levy et al. ............... 712/23 |

(Continued)

FOREIGN PATENT DOCUMENTS

EP    0768608 A2    4/1997

(Continued)

OTHER PUBLICATIONS

Lo et al.; "Software-Directed Register Deallocation for Simultaneous Multithreaded Processors," *IEEE Transactions on Parallel and Distributed Systems*, 10(9):922-933 (1999).

(Continued)

*Primary Examiner*—Lynne H. Browne
*Assistant Examiner*—Nitin C. Patel
(74) *Attorney, Agent, or Firm*—Myers Bigel Sibley & Sajovec, P.A.

(57) ABSTRACT

Processing circuits that are associated with the operation of threads in an SMT processor can be configured to operate at different performance levels based on a number of threads currently operated by the SMT processor. For example, in some embodiments according to the invention, processing circuits, such as a floating point unit or a data cache, that are associated with the operation of a thread in the SMT processor can operate in one of a high power mode or a low power mode based on the number of threads currently operated by the SMT processor. Furthermore, as the number of threads operated by the SMT operator increases, the performance levels of the processing circuits can be decreased, thereby providing the architectural benefits of the SMT processor while allowing a reduction in the amount of power consumed by the processing circuits associated with the threads. Related computer program products and methods are also disclosed.

37 Claims, 10 Drawing Sheets

U.S. PATENT DOCUMENTS

| | | | |
|---|---|---|---|
| 6,272,616 B1 | 8/2001 | Fernando et al. | 712/20 |
| 6,434,591 B1 * | 8/2002 | Watakabe et al. | 718/103 |
| 6,493,741 B1 * | 12/2002 | Emer et al. | 718/107 |
| 6,567,839 B1 * | 5/2003 | Borkenhagen et al. | 718/103 |
| 6,687,838 B1 * | 2/2004 | Orenstien et al. | 713/320 |
| 6,711,447 B1 | 3/2004 | Saeed | 700/82 |
| 6,859,882 B1 * | 2/2005 | Fung | 713/300 |
| 6,865,684 B1 * | 3/2005 | Atkinson | 713/323 |
| 2001/0005892 A1 | 6/2001 | Watts, Jr. et al. | 713/300 |
| 2004/0073905 A1 * | 4/2004 | Emer et al. | 718/101 |
| 2004/0088708 A1 * | 5/2004 | Ramanujam et al. | 718/107 |

FOREIGN PATENT DOCUMENTS

| | | |
|---|---|---|
| GB | 2375202 A | 11/2002 |
| KR | 1020030010759 | 2/2003 |
| WO | WO 01/48599 A1 | 7/2001 |
| WO | WO 03/019358 | 3/2003 |

OTHER PUBLICATIONS

Madon et al.; "A Study of a Simultaneous Multithreaded Processor Implementation," In Euro-Par '99 Parallel Processing, Amestoy et al. (Eds.) *Lecture Notes in Computer Science*, Springer-Verlag Heidelberg, 1685:716-726 (1999).

Snavely et al.; "Explorations in Symbiosis on two Multithreaded Architecture," In *Workshop on Multithreadeded Execution, Architecture, and Comilation*, Jan., 1999.

Snavely et al.; "Symbiotic Jobscheduling with Priorities for a Simultaneous Multithreading Processor," In *Ninth International Conference on Architectural Support for Programming Languages and Operating Systems*, Nov., 2000.

Tullsen and Eggers; "Effective Cache Prefetching on Bus-Based Multiprocessors," In *ACM Transactions on computer Systems*, 13(1):57-88 (1995).

Yong and Forney; "Emulating Unimplemented Instructions in a Simultaneous Multihthreaded Processor," *CS/ECE 752 Course Project Project*, Department of Computer Sceince, University of Wisconsin-Madison, Spring, 2000.

Combined Search and Examination Report, Appln. No. GB0403738.8, mailed Jun. 18, 2004.

Calder et al.; *Selective Value Prediction*; In the Proceedings of the 26th International Symposium on computer Architecture, May 1999, pp. 1-11.

Collins et al.; *Hardware Indentification of Cache Conflict Misses*; In the Proceedings of the 32nd Internatinal Symposium on Microarchitecture, Nov. 1999, 10 pages.

Collins et al.; *Speculative Precomputation: Long-range Prefectching of Delinquent Loads*, In the Proceedings of the 28th International Symposium on Computer Architecture, Jul. 2001, 12 pages.

Collins et al., *Dynamic Speculative Precomputation*; In the Proceedings of the 34th International Symposium on Microarchitecture, Dec. 2001, 12 pages.

Collins et al.: *Pointer Cache Assisted prefectching, pI In the Proceedings of the 35th Annual International Symposium on Microarchitecture*, Nov. 2002, pp. 1-12.

Kumar et al.: *Compiling for Instruction Cache Performance on a Multithreaded Architecture*, In the Proceedings of the 35th Internatinal Symposium on Microarchitecture, Nov. 2002, 11 pages.

Lo et al.: *Converting Thread-Level Parallelism to Instruction-Level Parallelism via Simultaneous Multithreading*, In ACM Transactions on Computer Sytems, Aug. 1997, pp. 1-25.

Lo, et al.; *Tuning Compiler Optimizations for Simultaneous Multithreading*, In the Proceedings of Micro-30, Dec. 1997, 12 pages.

Mitchell et al.; *ILP versus TLP on SMT*, In the Proceedings of Supercomputing, 1999, pp. 1-10.

Reinman et al.; *Classifying Load and Store Instructions for Memory Renaming*, In the Proceedings of the International Conference on Supercomputing, Jun. 1999, pp. 1-10.

Seng et al.; *Power-Sensitive Multithreaded Architecture*, In the Proceedings of the 200 International Conference in Computer Design, 2000, pp. 1-8.

Seng et al.; *Reducing Power with Dynamic Critical Path Informaiton*, In the Proceedings of the 34th International Symposium on Microarchitecture, 2001, 10 pages.

Snavely et al.; *Symbiotic Jobscheduling for Simultaneous Multithreading Processor*, in the Proceedings of ASPLOS IX, Nov. 2000, 11 pages.

Tullsen et al.: *Simultaneous Multithreading: Maximizing On-Chip Paralleslism*; In the Proceedings of the 22nd Annula International Sympoium on Computer Architecture, Jun. 1995, 12 pages.

Tullsen et al; *Supporting Fine-Grained Synchronization on a Simultaneous Multithreading Processor*, In the Proceedings of the 5th International Symposium on High-Performance Computer Architecture, Jan. 1999, 5 pages.

Tullsen et al.; *Storageless Value Prediction Using Prior Register Values*, I nthe Proceedings of the 26th International Symposium on Computer Architecture, May 1999, 10 pages.

Tullsen et al.; *Handling Long-latency Loads in a Simultaneous Multithreading Processor*; In the Proceedings of teh 34th Internatinal Symposium on Microarchitecture, Dec. 2001, 10 pages.

Tune et al.; *Quantifying Instruction Critically*, In the 11th International Conference on Parallel Architecture and Compilation Techniques (PACT), Sep. 2002, pp. 1-11.

Tune et al.; *Dynamic Prediction of Critical Path Instructions*, In the Proceedings of the 7th International Symposium on High Performance Computer Architecture, Jan. 2001, pp. 1-11.

Wallace et al.; *Threaded Multiple Path Execution*, In the Proceedings of the 25th International Symposium on Computer Architecture, Jun. 1998, pp. 1-12.

Wallace et al.: *Instruction Recycling on a Multiple-Path Processors*, In the Proceedings of the 5th International Symposium On High Performance computer Architecture, Jan. 1999, pp. 1-10.

Combined Search and Examination Report for British patent application 0508862.0 mailed on May 31, 2005.

* cited by examiner

SIMULTANEOUS MULTI-THREADING PROCESSOR CIRCUITS AND COMPUTER PROGRAM PRODUCTS CONFIGURED TO OPERATE AT DIFFERENT PERFORMANCE LEVELS BASED ON A NUMBER OF OPERATING THREADS AND METHODS OF OPERATING

CLAIM FOR PRIORITY

This application claims priority to Korean Application No. 2003-10759 filed Feb. 20, 2003, the entire contents of which are incorporated herein by reference.

FIELD OF THE INVENTION

The invention relates to computer processor architecture in general, and more particularly to simultaneous multi-threading computer processors, associated computer program products, and methods of operating same.

BACKGROUND

Simultaneous Multi-Threading (SMT) is a processor architecture that uses hardware multithreading to allow multiple independent threads to issue instructions during each cycle. Unlike other hardware multithreaded architectures in which only a single hardware context (i.e., thread) is active on any given cycle, SMT architecture can allow all thread contexts to simultaneously compete for and share processor resources.

An SMT processor can utilize otherwise wasted cycles to execute instructions that may reduce the effects of long latency operations in the SMT processor. Moreover, as the number of threads increases, so may the performance also increase, which may also increase the power consumed by the SMT processor.

A block diagram of a conventional SMT processor is illustrated in FIG. 1. The operation of the conventional SMT processor in FIG. 1 is discussed in Dean M. Tullsen; Susan J. Egger; Henry M. Levy; Jack L. Lo; Rebecca L. Stamm; et al., *Exploiting Choice: Instruction Fetch and Issue on an Implementable Simultaneous Multithreading Processor*, The 23$^{rd}$ Annual International Symposium on Computer Architecture, pp. 191–202, 1996, the disclosure of which is hereby incorporated herein by reference. The architecture and operation of conventional SMT processors is well understood in the art and will not be discussed herein in further detail.

SUMMARY

Embodiments according to the invention can provide processing circuits, computer program products, and or methods for operating at different performance levels based on a number of threads operated by a Simultaneous Multi-Threading (SMT) processor. For example, in some embodiments according to the invention, processing circuits, such as a floating point unit or a data cache, that are associated with the operation of a thread in the SMT processor can operate in one of a high power mode or a low power mode based on the number of threads currently operated by the SMT processor. Furthermore, as the number of threads operated by the SMT operator increases, the performance levels of the processing circuits can be decreased, thereby providing the architectural benefits of the SMT processor while allowing a reduction in the amount of power consumed by the processing circuits associated with the threads. Alternatively, the SMT processor may operate at the same power, but at higher performance or may consume more power but perform at higher performance levels than conventional SMT processors.

In some embodiments according to the invention, the processing circuit can be configured to operate at a first performance level when the number of threads currently operated by the SMT processor is less than or equal to a threshold value and can be configured to operate at a second performance level when the number of threads currently operated by the SMT processor is greater than the threshold value.

In some embodiments according to the invention, a performance level control circuit can be configured to provide a performance level for the processing circuit based on the number of threads currently operated by the SMT processor. In some embodiments according to the invention, the performance level control circuit can increase the performance level provided to the processing circuit to a first performance level when the number of threads currently operated by the SMT processor is less than or equal to a threshold value. The performance level control circuit can decrease the performance level provided to the at least one processing circuit to a second performance level that is less than the first performance level when the number of threads currently operated by the SMT processor exceeds the threshold value.

In some embodiments according to the invention, the performance level control circuit further decreases the performance level provided to the processing circuit to a third performance level that is less than the second performance level when the number of threads currently operated by the SMT processor exceeds a second threshold value that is greater than the first threshold value.

Various embodiments of performance level variation can be provided according to the invention. For example, in some embodiments according to the invention, the processing circuit can be a cache memory circuit that includes a tag memory and a data memory configured to provide cached data concurrent with an access to the tag memory when the cache memory circuit operates at a first performance level. The data memory can be configured to provide cached data responsive to a hit in the tag memory when the cache memory circuit operates at a second performance level that is less than the first performance level.

In some embodiments according to the invention, the cache memory can be at least one of a data cache memory configured to store data operated on by instructions and an instruction cache memory configured to store instructions that operate on associated data. In some embodiments according to the invention, the data memory can be further configured to not provide cached data responsive to a miss in the tag memory when operating at the second performance level.

In some embodiments according to the invention, the processing circuit can be a floating point unit. In some embodiments according to the invention, the floating point unit can be a first floating point unit configured to operate at a first performance level when the number of threads operated by the SMT processor is less than or equal to a threshold value and the SMT processor can further include a second floating point circuit that configured to operate at a second performance level, that is less than the first performance level, when the number of threads operated by the SMT processor is greater than the threshold value.

In some embodiments according to the invention, the performance level control circuit can be configured to increase or decrease the number of threads currently operated by the SMT processor responsive to threads being created and completed, respectively, in the SMT processor.

In some embodiments according to the invention, a second processing circuit can be configured to operate at a second performance level that is less than the first performance level responsive to the number of threads currently operated in the SMT processor being increased to greater than the threshold value.

In some embodiments according to the invention, the performance level control circuit can be configured to decrease a performance level provided to the at least one processing circuit responsive to creation of a new thread to increase the number of threads currently operated by the SMT processor from less than or equal to a threshold value to greater than the threshold value. In some embodiments according to the invention, the performance level control circuit can be configured to reduce a performance level of the processing circuit to one of a plurality of descending performance levels as the number of threads currently operated by the SMT processor exceeds each of a plurality of ascending threshold values.

In some embodiments according to the invention, the performance level control circuit can be configured to maintain a first performance level for a first processing circuit and to provide a second performance level, that is less than the first performance level, to a second processing circuit responsive to the number of threads currently operated by the SMT processor increasing from less than or equal to a threshold value to greater than the threshold value.

In other embodiments according to the invention, a performance level control circuit can be configured to provide a performance level to processing circuits in the SMT processor based on a number of threads currently operated by the SMT processor.

In still other embodiments according to the invention, a thread management circuit can be configured to assign processing circuits associated with the SMT processor to threads operated in the SMT processor as the threads are created. A performance level control circuit can be configured to provide one of a plurality of performance levels to the processing circuits based on a number of threads currently operated by the SMT processor compared to at least one threshold value.

In still other embodiments according to the invention, a cache memory associated with an SMT processor can include a tag memory and a data memory accessed either concurrently or subsequent to the tag memory based on a number of threads currently operated by the SMT processor.

DESCRIPTION OF EMBODIMENTS ACCORDING TO THE INVENTION

Figure 1:
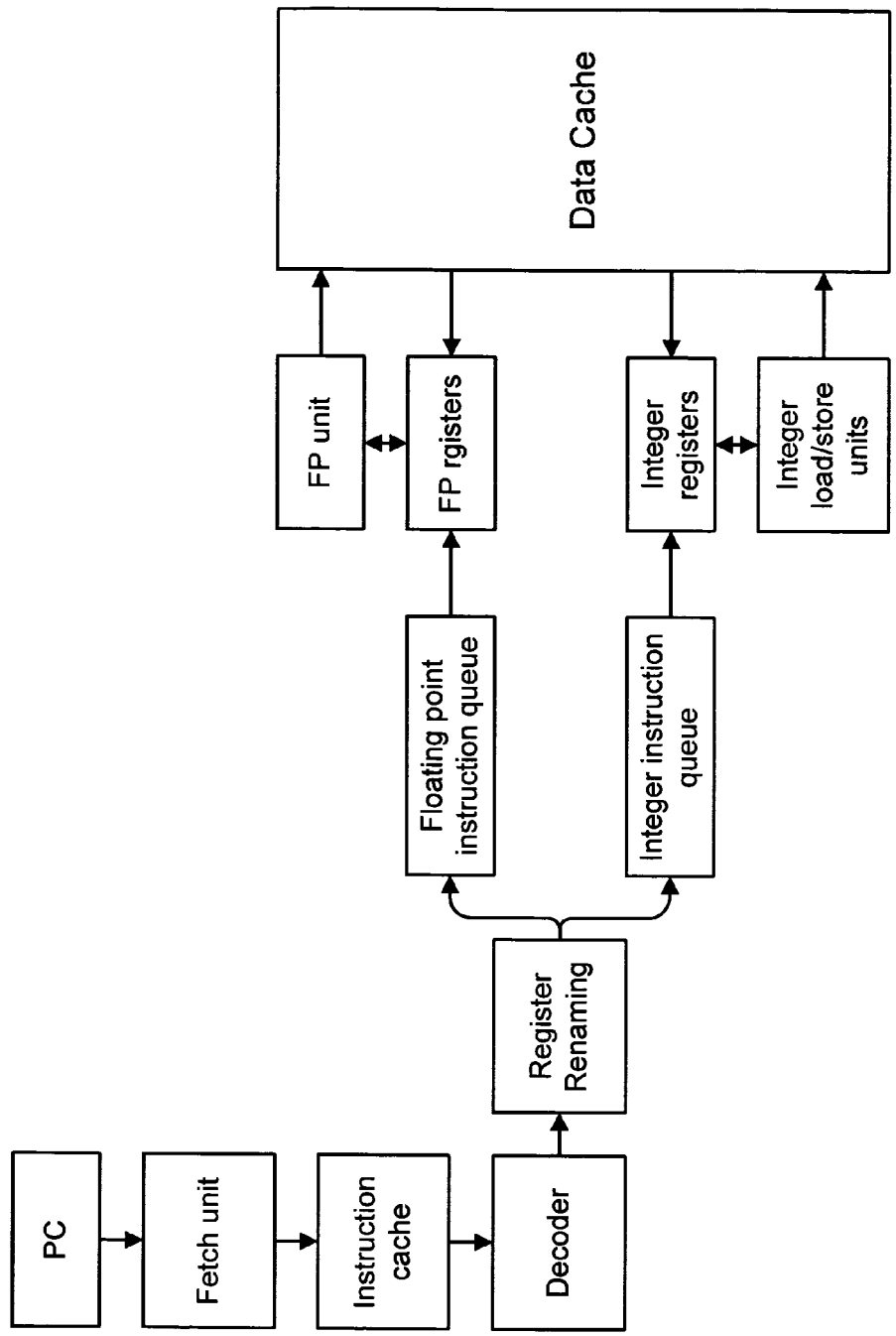
FIG. 1 is a block diagram that illustrates a conventional Simultaneous Multi-Threading (SMT) processor architecture.

The invention now will be described more fully hereinafter with reference to the accompanying drawings, in which illustrative embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

It will be understood that although the terms first and second are used herein to describe various elements, these elements should not be limited by these terms. These terms are only used to distinguish one element from another element. Thus, a first element discussed below could be termed a second element, and similarly, a second element may be termed a first element without departing from the teachings of this disclosure.

As will be appreciated by one of skill in the art, the present invention may be embodied as circuits, computer program products, and/or computer program products. Accordingly, the present invention may take the form of an entirely hardware embodiment, an entirely software embodiment or an embodiment combining software and hardware aspects. Furthermore, the invention may take the form of a computer program product on a computer-usable storage medium having computer-usable program code embodied in the medium. Any suitable computer readable medium may be utilized including hard disks, CD-ROMs, optical storage devices, or magnetic storage devices.

Computer program code or "code" for carrying out operations according to the present invention may be written in an object oriented programming language such as JAVA®, Smalltalk or C++, JavaScript, Visual Basic, TSQL, Perl, or in various other programming languages. Software embodiments of the present invention do not depend on implementation with a particular programming language. Portions of the code may execute entirely on one or more systems utilized by an intermediary server.

The code may execute entirely on one or more computer systems, or it may execute partly on a server and partly on a client within a client device, or as a proxy server at an intermediate point in a communications network. In the latter scenario, the client device may be connected to a server over a LAN or a WAN (e.g., an intranet), or the connection may be made through the Internet (e.g., via an Internet Service Provider). The invention may be embodied using various protocols over various types of computer networks.

The invention is described below with reference to block diagrams and flowchart illustrations of methods, systems and computer program products according to embodiments of the invention. It is understood that each block of the block diagrams and flowcharts, and combinations of blocks in the block diagrams and flowcharts, can be implemented by computer program instructions. These computer program instructions may be provided to a Simultaneous Multi-Threading (SMT) processor circuit, special purpose computer, or other programmable data processing apparatus to produce a machine, such that the instructions, which execute via the processor of the computer or other programmable data processing apparatus, create means for implementing the functions specified in the block diagrams and/or flowchart block or blocks.

These computer program instructions may be stored in a computer-readable memory that can direct a computer or other programmable data processing apparatus to function in a particular manner, such that the instructions stored in the computer-readable memory produce an article of manufacture including instruction means which implement the function specified in the block diagrams and/or flowchart block or blocks.

The computer program instructions may be loaded into an SMT processor circuit or other programmable data processing apparatus to cause a series of operational steps to be performed on the computer or other programmable apparatus to produce a computer implemented process such that the instructions which execute on the computer or other programmable apparatus provide steps for implementing the functions specified in the block diagrams and/or flowchart block or blocks.

Embodiments according to the invention can provide processing circuits that are associated with the operation of threads in an SMT processor wherein the processing circuits are configured to operate at different performance levels based on a number of threads currently operated by the SMT processor. It will be understood that different performance levels can include different operating speeds of circuits and/or different levels of precision. In some embodiments according to the invention, processing circuits according to the invention may operate at different clock speeds and/or use different circuit types (such different types of CMOS devices) to provided the different performance levels. For example, in some embodiments according to the invention, processing circuits, such as a floating point unit or a data cache, that are associated with the operation of a thread in the SMT processor can operate in one of a high power mode at a high clock speed or a low power mode at a lower clock speed based on the number of threads currently operated by the SMT processor. Furthermore, as the number of threads operated by the SMT operator increases, the performance levels of the processing circuits can be decreased, thereby providing the architectural benefits of the SMT processor while allowing a reduction in the amount of power consumed by the processing circuits associated with the threads.

It will be understood that embodiments according to the invention can exhibit thread-level parallelism that can use multiple threads of execution that are inherently parallel to one another. As used herein, a "thread" can be a separate process having associated instructions and data. A thread can represent a process that is a portion of a parallel computer program having multiple processes. A thread can also represent a separate computer program that operates independently from other programs. Each thread can have an associated state, defined, for example, by respective states for associated instructions, data, Program Counter, and/or registers. The associated state for the thread can include enough information for the thread to be executed by a processor.

In some embodiments according to the invention, a performance level control circuit is configured to provide the respective performance levels to the processing circuits that are allocated to the threads created in the SMT processor. For example, the performance level control circuit can provide a first performance level so that a processing circuit can operate in a high power mode and, further, can provide a second performance level to the processing circuit for operation in a low power mode. In still other embodiments according to the invention, intermediate performance levels (i.e., other performance levels between high power and low power) are provided by the performance level control circuit.

In some embodiments according to the invention, the processing circuits that operates at different performance levels can be a cache memory that includes a tag memory and a data memory. When the cache memory operates at the first performance level (i.e., in high power mode), the tag memory and data memory can be accessed concurrently regardless of whether an access to the tag memory result in a hit. The concurrent access of the data memory can provide greater performance as the hit rate in the tag memory may be high. Alternatively, the cache memory can also operate at a second performance level (i.e., lower power mode) wherein the data memory is only accessed responsive to a hit in the tag memory. Therefore, some of the power consumption associated with accessing the data memory can be avoided in cases where a tag miss occurs. Furthermore, in cases where a tag hit occurs, the access to the tag memory and the access to data memory may be offset in time.

In still other embodiments, the processing circuits associated with the operation of threads by the SMT processor can be an instruction cache or other types of processing circuits, such as floating point circuits or integer/load-store circuits. Moreover, each of these processing circuits may operate at different performance levels. For example, in some embodiments according to the invention, the cache memory, the instruction cache, and floating point circuits and integer/load-store circuits can operate at different performance levels concurrently.

In still further embodiments according to the invention, processing circuits of the same type (such as floating point circuits and integer/load-store circuits) can be separated into different performance categories such that some of the circuits are designated to operate at the first performance level whereas other processing circuits are designated to operate at the second performance level. For example, in some embodiments according to the invention, some of the floating point circuits available for allocation to threads in the SMT processor are configured to operate in a high power mode whereas other floating point circuits available for allocation to threads in the SMT processor are configured to operate in low power mode.

Figure 2:
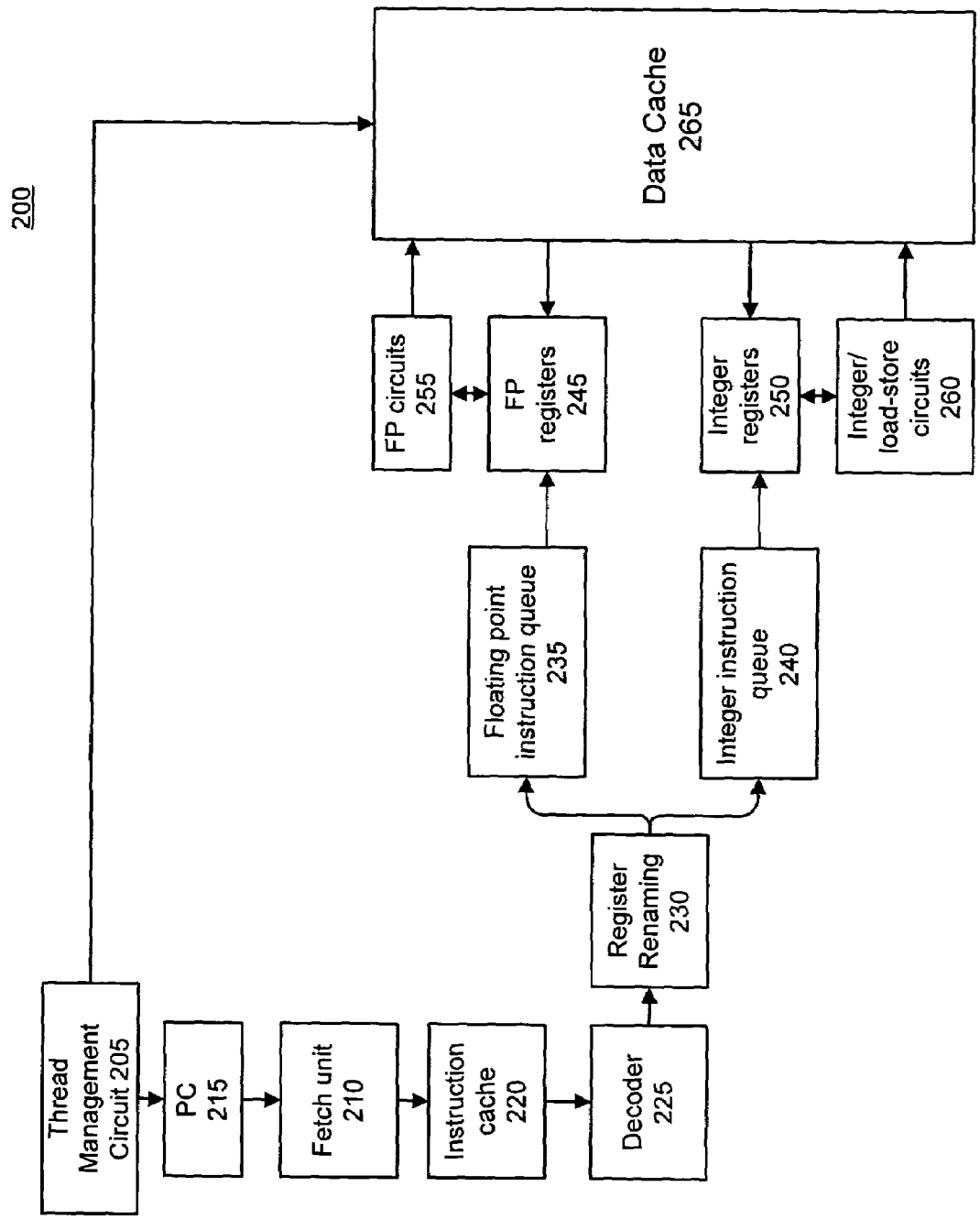
FIG. 2 is a block diagram that illustrates embodiments of an SMT processor according to the invention.

FIG. 2 is a block diagram that illustrates embodiments of SMT processors according to the invention. According to FIG. 2, when a new thread is created in an SMT processor 200, a thread management circuit 205 allocates a set of processing circuits for use by the newly created thread. The allocated processing circuits can include a program counter 215, a set of floating point registers 245, and a set of integer registers 250. Other processing circuits can also be allocated to the newly created thread. It will be understood that when the thread completes, the processing circuits allocated for use by the thread can be released so that they may be reallocated to subsequently created threads.

In operation, a fetch circuit 210 fetches an instruction from an instruction cache 220, based on a location provided by the allocated program counter 215, which is provided to a decoder 225. The decoder 225 outputs a decoded instruction to a register renaming circuit 230. A renamed instruction is provided by the register renaming circuit 230 to either a floating point instruction queue 235 or an integer instruction queue 240 depending on the type of instruction provided by the register renaming circuit 230. For example, if the type of instruction provided by the register renaming circuit 230 is a floating point instruction, the instruction will be loaded into the floating point instruction queue 235, whereas if the instruction provided by the register renaming circuit 230 is an integer instruction the instruction is loaded into the integer instruction queue 240.

The instructions from either the floating point instruction queue 235 or the integer instruction queue 240 are loaded into an associated register for execution by a respective floating point circuit 255 or integer/load-store circuit 260. In particular, floating point instructions are transferred from the floating point instructions queue 235 to a set of floating point registers 245. The instructions in the floating point registers 245 can be accessed by the floating point circuits 255. The floating point circuits 255 can also access floating point data stored in a data cache 265 such as when instructions executed by the floating point circuits 255 (from the floating point registers 245) refer to data stored in the data cache 265.

Integer instructions are transferred from the integer instruction queue 240 to integer registers 250. The integer/load-store circuits 260 can access the integer instructions stored in the integer registers 250 so that the instructions can be executed. The integer/load-store circuits 260 can also access the data cache 265 when, for example, the integer instructions stored in the integer registers 250 refer to integer data stored in the data cache 265.

According to embodiments of the invention, the thread management circuit 205 provides a performance level to the data cache 265. In particular, the performance level can control whether the data cache 265 operates at a first performance level or a second performance level (i.e., in a high power mode or in a low power mode). For example, the thread management circuit 205 can provide a first performance level wherein the data cache 265 operates in a high power mode or can provide a second performance level wherein the data cache 265 operates in a low power mode. It will be understood that although the operation of the data cache 265 is described as being either at a first performance level or a second performance level, in some embodiments according to the invention, more performance levels can be used.

Figure 3:
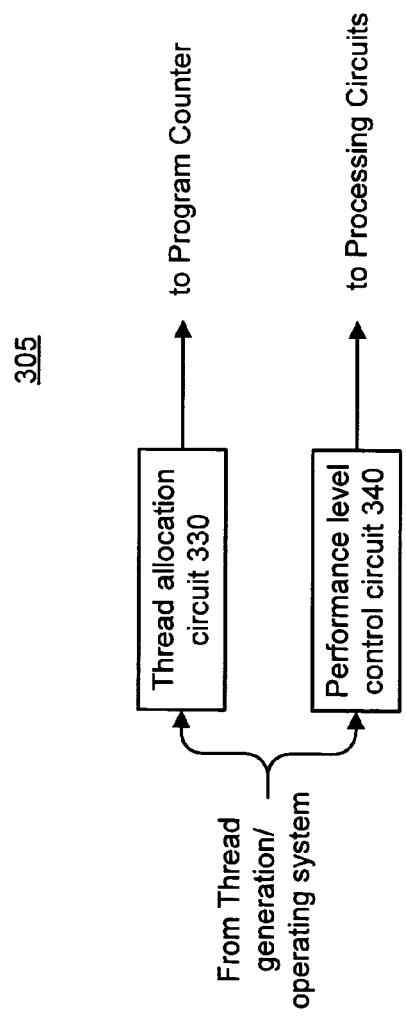
FIG. 3 is a block diagram that illustrates embodiments of a thread management circuit according to the invention.

FIG. 3 is a block diagram that illustrates embodiments of thread management circuits according to the invention. According to FIG. 3, a thread management circuit 305 receives information from the operating system, or alternatively, from a thread generation circuit related to the creation of a thread in the SMT processor. The thread management circuit 305 includes a thread allocation circuit 330 that can allocate processing circuits according to the invention for use by the thread created by the SMT processor.

The thread management circuit 305 also includes a performance level control circuit 340 that provides the performance level to the processing circuits associated with the thread created by the SMT processor. The performance level control circuit 340 can provide the performance level to the processing circuit based on the number of threads currently operated by the SMT processor. In particular, as the number of threads operated by the SMT processor increases, the performance level control circuit may provide decreasing performance levels to the processing circuits associated with the threads operated by the SMT processor. The performance level control circuit 340 can determine the number of threads currently operated by the SMT processor by incrementing and decrementing an internal count responsive to the creation and completion of threads operated by the SMT processor.

It will be understood that the performance level provided to the processing circuits according to the invention may have a default value, such as the first performance level (or high power mode). Accordingly, as threads are added, the performance level provided to the processing circuits can be reduced to decrease the performance and, therefore, the power dissipation of the processing circuits. It will also be understood that the performance level can be provided to the processing circuits via a signal line that can conduct a signal having at least two states: the first performance level and the second performance level. For example, after the SMT processor is initialized, the number of threads operated by the SMT processor can be zero, wherein the default value of the performance level provided to the processing circuits is the default first performance level (high power mode). As threads are added and eventually exceed a threshold number, the performance level can be changed to the second performance level by, for example, changing the state of the signal that indicates which performance level is to be used.

Figure 4:
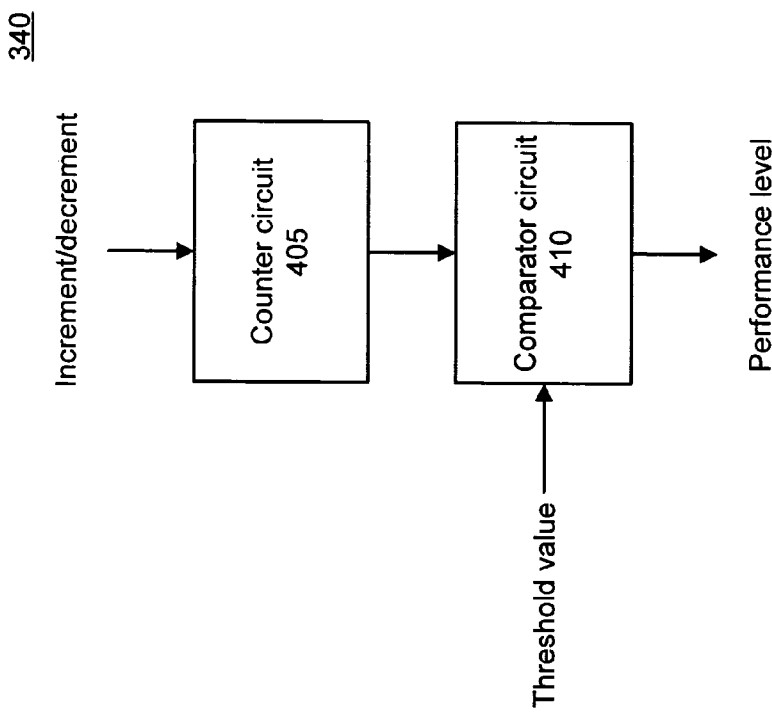
FIG. 4 is a block diagram that illustrates embodiments of a performance level control circuit according to the invention.

FIG. 4 is a block diagram that illustrates embodiments of performance level control circuits according to the invention. According to FIG. 4, a counter circuit 405 can receive information from the operating system or thread generation circuit discussed in reference to FIG. 3 to determine the number of threads currently operated by the SMT processor. For example, if the counter circuit 405 indicates that four threads have previously been started by the SMT processor when information is received regarding the creation of a new thread, the counter circuit 405 can be incremented to reflect that five threads are currently operated by the SMT processor.

The counter circuit 405 can provide the number of threads currently operated by the SMT processor to a comparator circuit 410. A threshold value is provided to comparative circuit 410 along with the number of threads currently operated by the SMT processor. The threshold value can be a programmable value that indicates the number of threads beyond which the performance level is changed. Accordingly, when the number of threads currently operated by the SMT processor is less than or equal to the threshold value, the performance mode provided to the processing circuits can be maintained in a first performance level, such as a high power mode. However, when the number of threads currently operated by the SMT processor exceeds the threshold value, the performance level can be decreased so as to reduce the power dissipated by the SMT processor.

Figure 5:
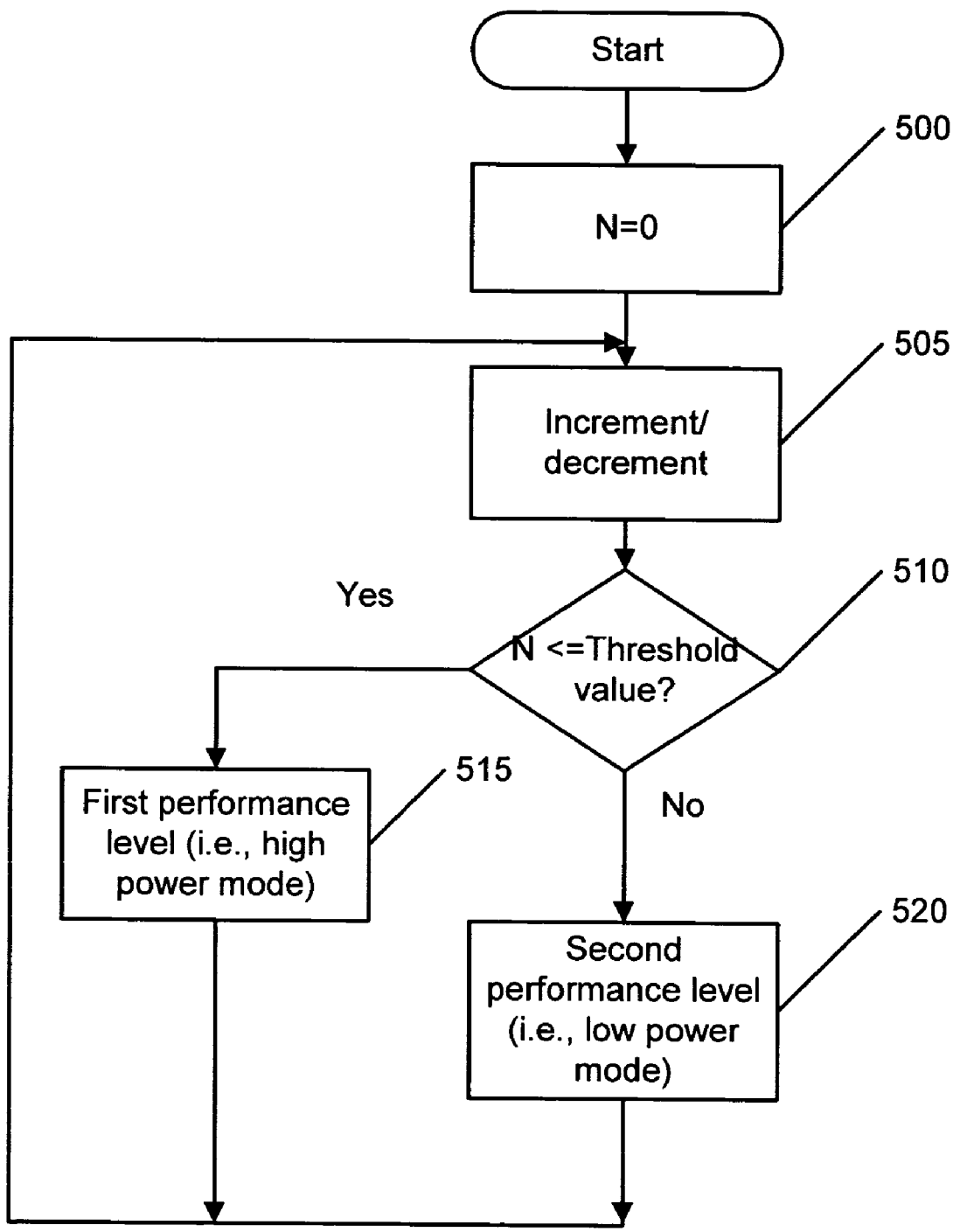
FIG. 5 is a flowchart that illustrates embodiments of performance level control circuits according to the invention.

FIG. 5 is a flow chart that illustrates operations of embodiments of performance level control circuits according to the invention. According to FIG. 5, when the SMT processor is initialized, the number of threads currently operated by the SMT processor is zero (Block 500). As threads are created and completed in the SMT processor, the number of threads, N, currently operating in the SMT processor is incremented or decremented (Block 505). For example, in a case where four threads are operated by the SMT processor, the value of N would be four. When a new thread is created, the value of N is incremented to five, whereas if one of the threads subsequently completes, the value of N is decremented back to four.

The number of threads currently operating in the SMT processor is compared to a threshold value (Block 510). If the number of threads currently operated by the SMT processor is less than or equal to the threshold value, the performance level control circuit provides a first performance level to the processing circuits allocated to the threads (Block 515). For example, if a processing circuit allocated to the thread is the cache memory discussed in reference to FIG. 2, the cache memory can operate so that the tag memory and the data memory are accessed concurrently (i.e., in high power mode). On the other hand, if the number of threads operated by the SMT processor is greater than the threshold value (Block 510), the performance level control circuit provides a second performance level to the processing circuits associated with threads (Block 520). For example, in the embodiments discussed above in reference to FIG. 2, at the second performance level, the cache memory can operate such that the data memory is only accessed responsive to a hit in the tag memory (i.e., in low power mode).

Figure 6:
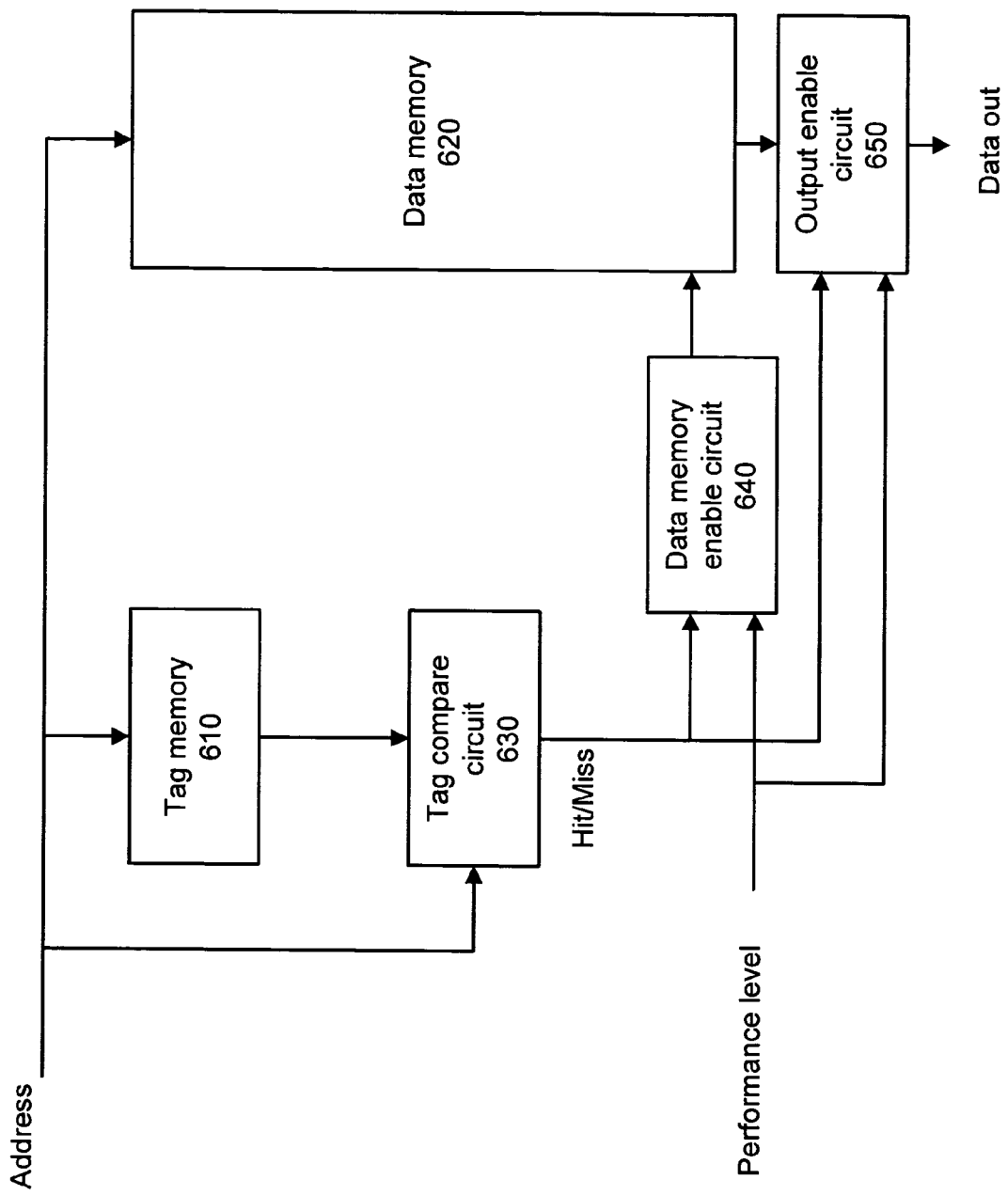
FIG. 6 is a block diagram that illustrates embodiments of a cache memory according to the invention.

FIG. 6 is a block diagram that illustrates embodiments of a cache memory according to the invention as shown in FIG. 2. According to FIG. 6, a tag memory 610 is configured to store addresses of data stored in a data memory 620. The tag memory 610 is accessed using an address that is associated with data to be acted on by the SMT processor. Entries in the tag memory 610 are compared with the address by a tag compare circuit 630 to determine whether the data needed by the SMT processor is stored in the data memory 620. If the tag compare circuit 630 determines that the tag memory 610 indicates that the required data is stored in the data memory 620, a tag hit Occurs. Otherwise, a tag miss occurs. If a tag hit occurs, an output enable circuit 650 enables data to be output from the data memory 620.

According to embodiments of the invention, the performance level provided by the performance level control circuit is used to control how the tag memory 610 and the data memory 620 operate. In particular, if a first performance level is provided to the cache memory, a data memory enable circuit 640 enables the data memory 620 to be accessed concurrent with the tag memory 610 regardless of whether a tag hit occurs. In contrast, if a second performance level is provided to the cache memory, the data memory enable circuit 640 does not allow the data memory 620 to be accessed unless a tag hit occurs.

Therefore, in embodiments according to the invention, in a high power mode the tag memory 610 and the data memory 620 can be accessed concurrently to provide improved performance, whereas in a low power mode the data memory 620 is accessed only if the tag memory 610 indicates that a tag hit has occurred, thereby allowing the power dissipated by the cache memory to be reduced.

Figure 7:
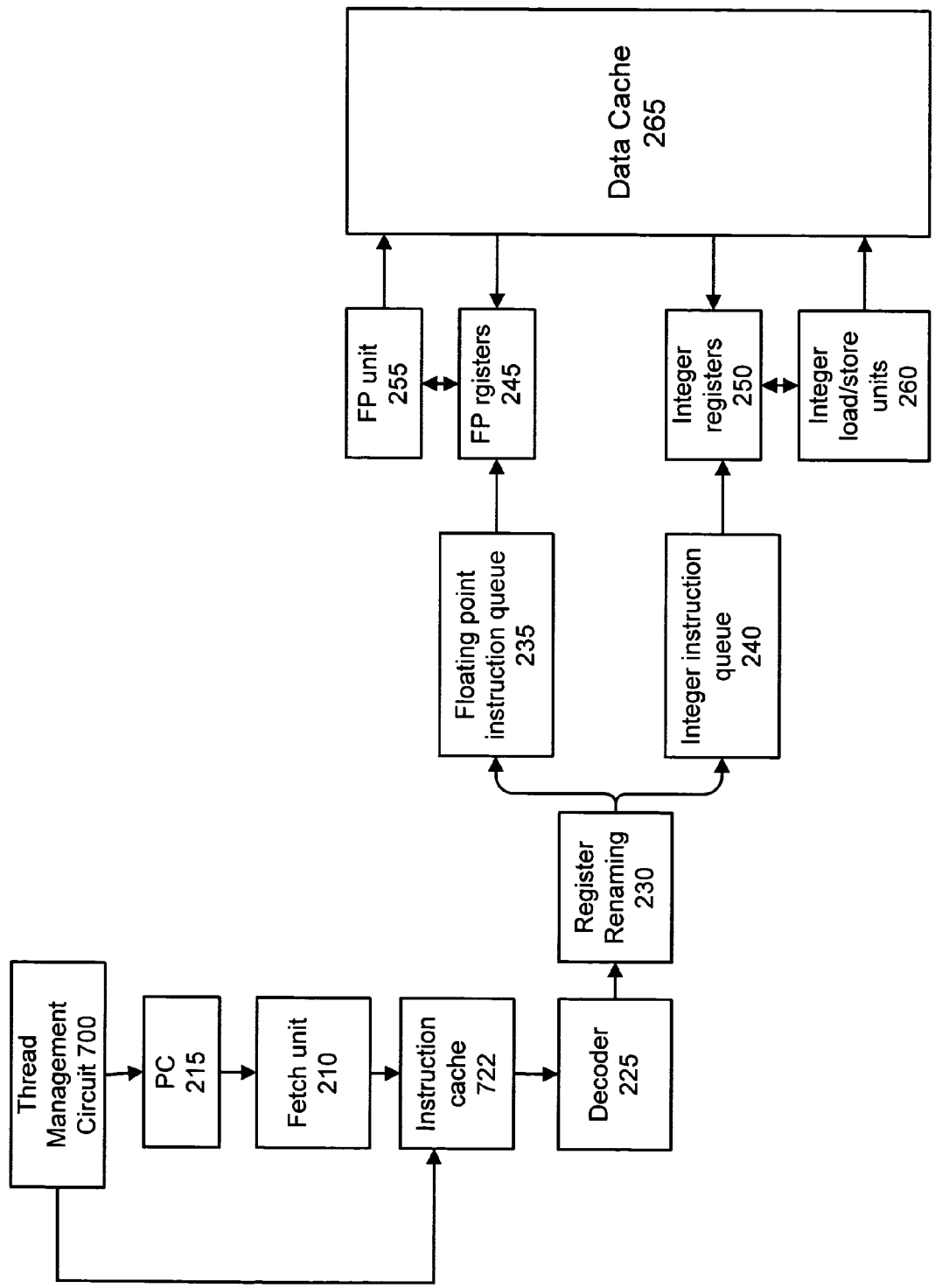
FIG. 7 is a block diagram that illustrates embodiments of an SMT processor according to the invention.

FIG. 7 is a block diagram that illustrates embodiments according to the invention utilized in an instruction cache. According to FIG. 7, the thread management circuit 700 allocates the instruction cache 722 to a new thread. The performance level control circuit included in the thread management circuit 300 can provide a performance level to the instruction cache 722 to control how the instruction cache 722 operates.

In particular, the instruction cache 722 can operate in a high power mode in response to the first performance level and can be configured to operate in a low power mode in response to a second performance level. As discussed above in reference to, for example, FIG. 5, the first and second performance levels can be provided to the instruction cache 722 based on the number of threads that is currently operated by the SMT processor. Furthermore, the instruction cache 722 can operate at the different performance levels in similar ways to those described above in reference to FIG. 6, wherein the data memory 620 is only accessed responsive to a tag hit in low power mode. For example, different performance levels may be provided in the instruction cache to allow direct addressing when successive memory accesses are determined to be to the same cache line. This type of restriction may be employed using a direct-addressed cache which can allow a read of the tag Random Access Memory (RAM) be avoided, which may also allow a tag compare to be eliminated. Furthermore, in direct-addressed caches a translation from a virtual to a physical address may also be avoided.

Figure 8:
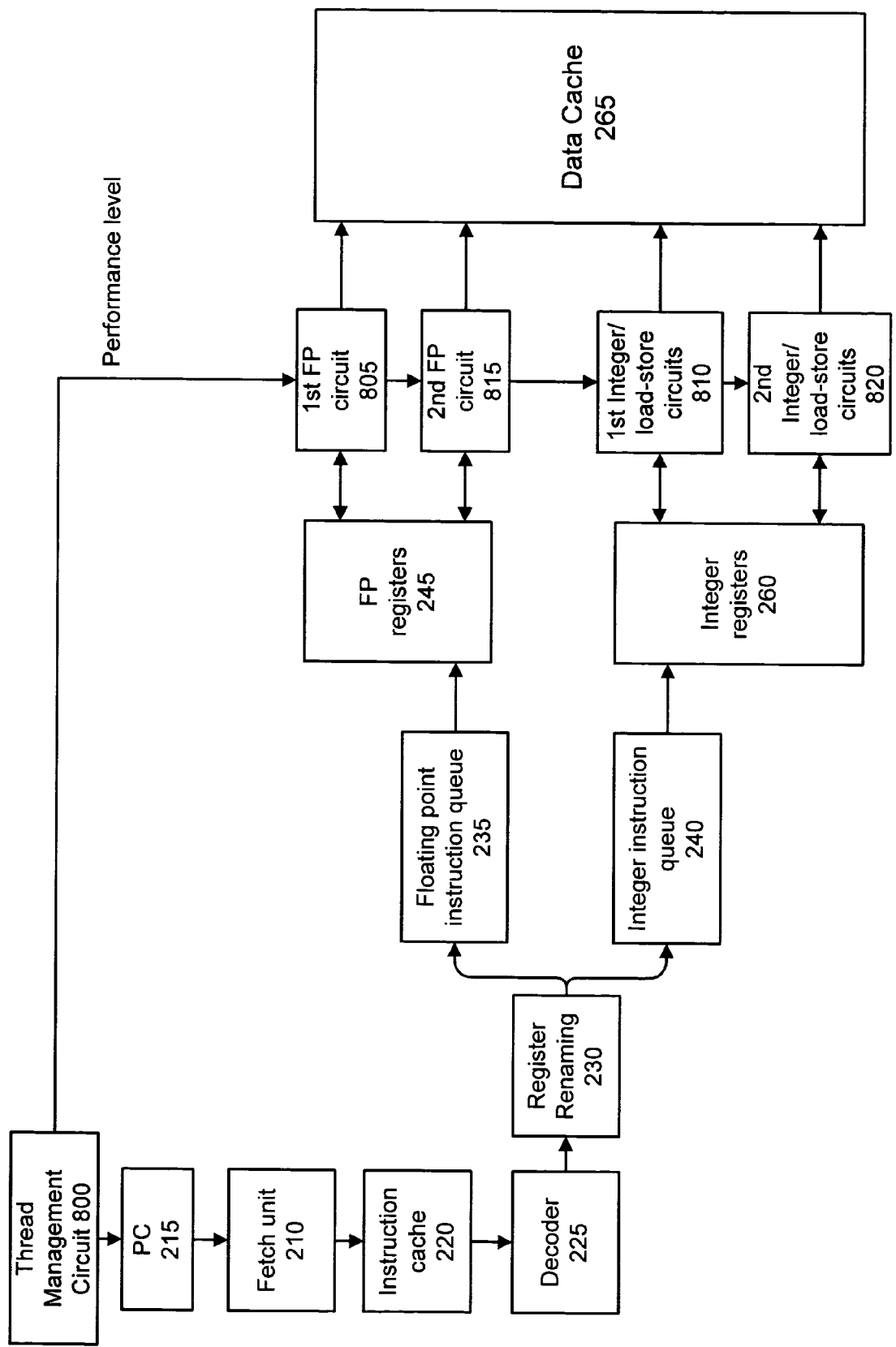
FIG. 8 is a block diagram that illustrates embodiments of an SMT processor according to the invention.

FIG. 8 is a block diagram that illustrates embodiments of separate processing circuits having different performance levels according to the invention. According to FIG. 8, a first floating point circuit 805 can be configured to operate at a first performance level whereas a second floating point circuit 815 can be configured to operate at a second performance level that is lower than the first performance level. In other words, the first floating point circuit 805 can be for use in high power mode whereas the second floating point circuit 815 can be used in low power mode.

A first integer/load-store circuit 810 is configured to perform at the first performance level, whereas a second integer/load-store circuit 820 is configured to operate at the second performance level. A thread management circuit 800 is configured to provide two separate performance levels. In particular, the first performance level is provided to the first floating point circuit 805 and to the first integer/load-store circuit 810. The second performance level provided by the thread management circuit 800 is provided to the second floating point circuit 815 and to the second integer/load-store circuit 820. Accordingly, the first floating point circuit 805 and the first integer/load-store circuit 810 can be allocated to threads that operate at the first performance level, whereas the second floating point circuit 815 and the second integer/load-store circuit 820 can be allocated to threads that operate at the second performance level. It will be understood that the first and second performance levels can be provided by the thread management circuit 800 either separately or concurrently. It will also be understood that more than two separate floating point circuits and integer/load-store can be provided as can additional performance levels.

According to embodiments of the invention, the first performance level provided to the first floating point circuit 805 and the first integer/load-store circuit 810 can be provided when the number of threads operated in the SMT processor is less than or equal to a first threshold value. The second performance level can be provided to the second floating point circuit 815 and the second integer/load-store circuit 820 when the number of threads currently operated by the SMT processor exceeds the first threshold value. Accordingly, when the number of threads operated by the SMT processor exceeds the threshold value, all threads (both those previously existing and those newly created) can use the second floating point unit 815 and the second integer/load-store circuit 820 to reduce the power consumed by the SMT processor.

It will be understood that floating point circuits and integer/load-store circuits according to the invention may operate at different clock speeds and/or use different circuit types (such different types of CMOS devices) to provided the different performance levels. For example, in some embodiments according to the invention, a floating point circuit that is associated with the operation of a thread in the SMT processor cain operate in one of a high power mode at a high clock speed or a low power mode at a lower clock speed based on the number of threads currently operated by the SMT processor.

Figure 9:
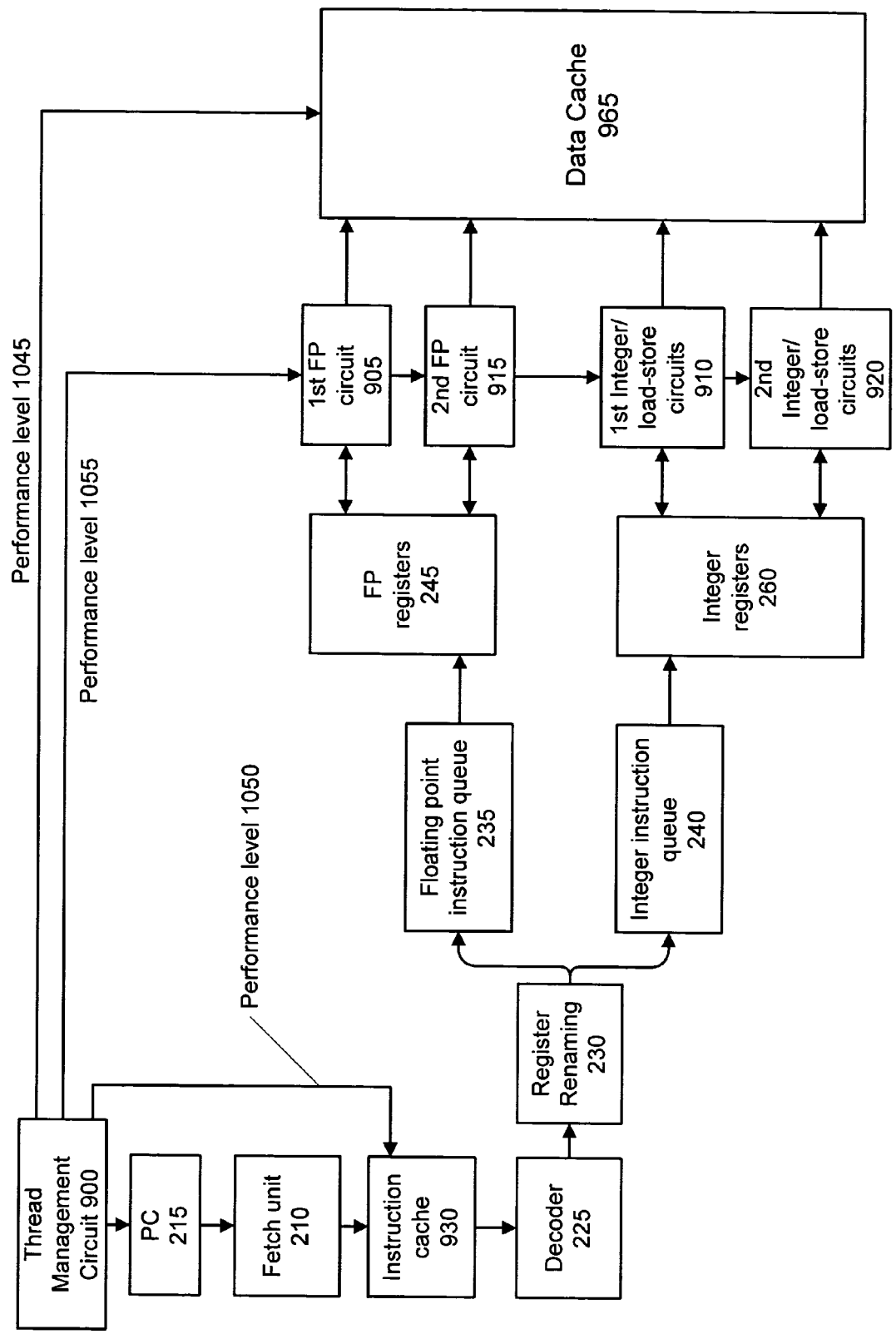
FIG. 9 is a block diagram that illustrates embodiments of an SMT processor according to the invention.

FIG. 9 is a block diagram that illustrates the embodiment of SMT processors including a plurality of processing circuits that are responsive to separate performance levels provided by a thread management circuit 900. In particular, the thread management circuit 900 provides three separate performance levels to an instruction cache 930, a data cache 965, first and second floating point circuits 905, 915, and first and second integer/load-store circuits 910, 920. It will be understood that the performance level provided to the first and second floating point circuits 905, 915 and to the first and second integer/load-store circuits 910, 920 can operate as discussed above in reference to FIG. 8. Furthermore, the data cache 965 and the instruction cache 930 can operate as described above in reference to FIGS. 2 and 7, respectively.

Accordingly, the separate performance levels can be provided to the different processing circuits so that the processing circuits can operate at different performance levels thereby provided greater control over a tradeoff between performance and power consumption. For example, the instruction cache may operate at the first performance level while the data cache 265 and the first and second floating point circuits 905, 915, and first and second integer/load-store circuits 910, 920 operate at the second performance level. Other combinations of performance levels may also be used.

Figure 10:
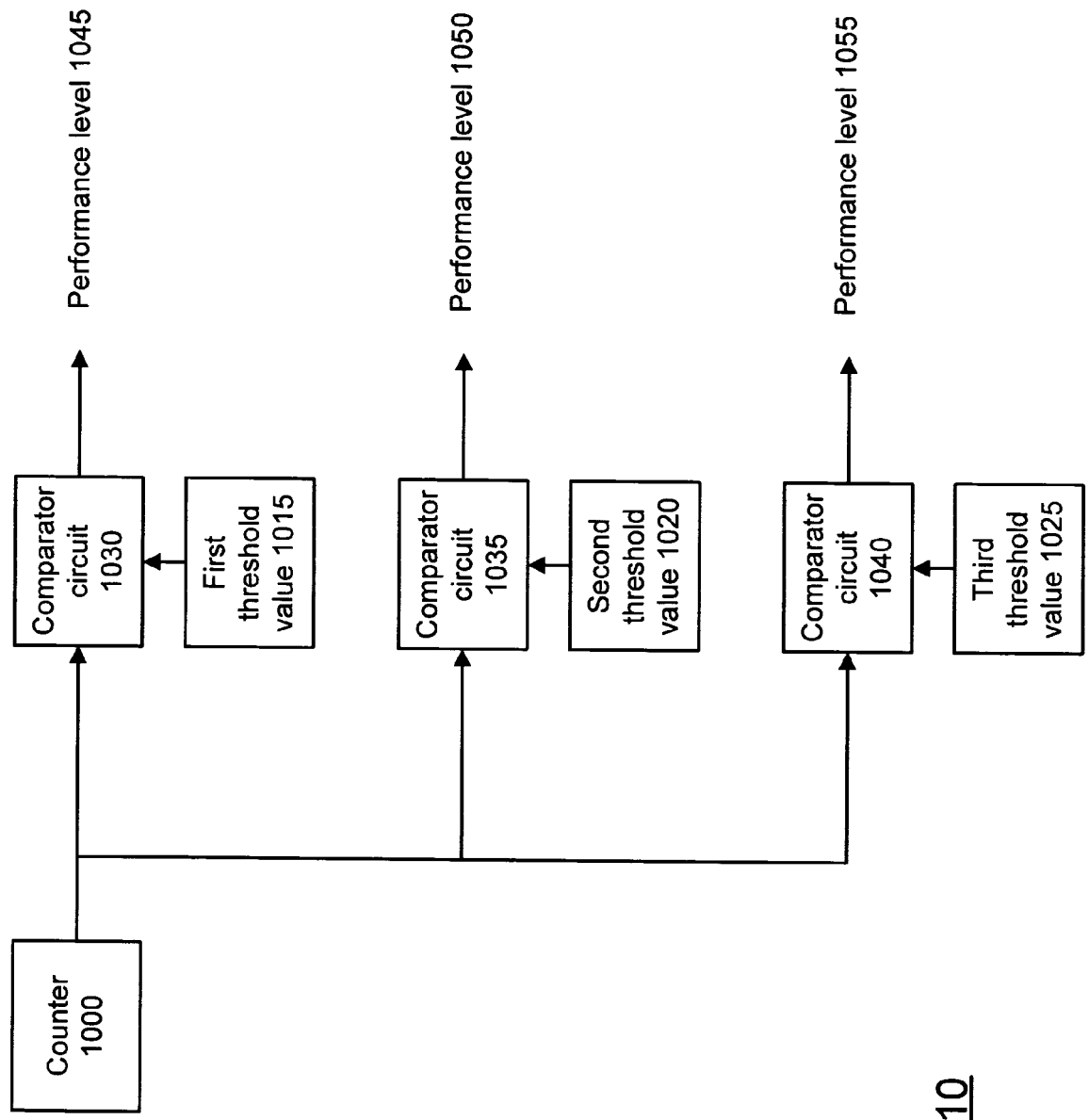
FIG. 10 is a block diagram that illustrates embodiments of a performance level control circuit according to the invention.

FIG. 10 is a block diagram that illustrates operations of embodiments of a performance level control circuit included in the thread management circuit 900 in FIG. 9. In particular, the performance level control circuit includes a counter 1000 that is incremented and decremented in response to threads being created and completed in the SMT processor. First through third registers 1015, 1020, 1025, each can store a separate threshold value of a number of threads currently operating in the SMT processor. Three comparator circuits 1030, 1035, and 1040, are coupled to respective ones of the registers 1015, 1020, and 1025. In particular, the first register 1015 that stores the first threshold value is coupled to the first comparator circuit 1030. The second register 1020 that stores the second threshold value is coupled to the second comparator circuit 1035. The third register 1025 that stores the third threshold value is coupled to the third comparator circuit 1040.

Each of the comparator circuits 1130, 1035, 1040 compares the number of threads currently operated by the SMT processor with the threshold value stored in the respective register. If the first comparator circuit 1030 determines that the current number of threads operated by the SMT processor is greater than the first threshold value in the first register 1015, the first comparator circuit 1130 generates a performance level 1045, which as shown in FIG. 9, is coupled to the data cache 965. Accordingly, when the number of threads operated by the SMT processor exceeds the threshold value in the first register 1015, the performance level of the data cache 965 is changed from the first performance level to the second performance level (i.e., from high power mode to low power mode).

If the second comparator circuit 1035 determines that the number of threads currently operated by the SMT processor exceeds the threshold value stored in the second register 1020, the second comparator circuit 1035 generates a performance level 1050 that is coupled to the instruction cache 930, thereby changing the performance level of the instruction cache 930 from the first performance level to the second performance level (i.e., from high power mode to low power mode).

If the third comparator circuit 1040 determines that the number of the threads currently operated by the SMT processor exceeds the threshold value stored in the third register 1025, the third comparator circuit 1040 generates a performance level 1055 that is coupled to the first and second floating point circuits 905, 915, and the first and second integer/load-store circuits 910, 920. Accordingly, the performance level of these processing circuits is also changed from the first performance level to the second performance level (i.e., from high power mode to low power mode). It will be understood that the performance level 1055 coupled to the floating point circuits and the integer/load-store circuits operate as discussed above in reference to FIG. 8.

Figure 11:
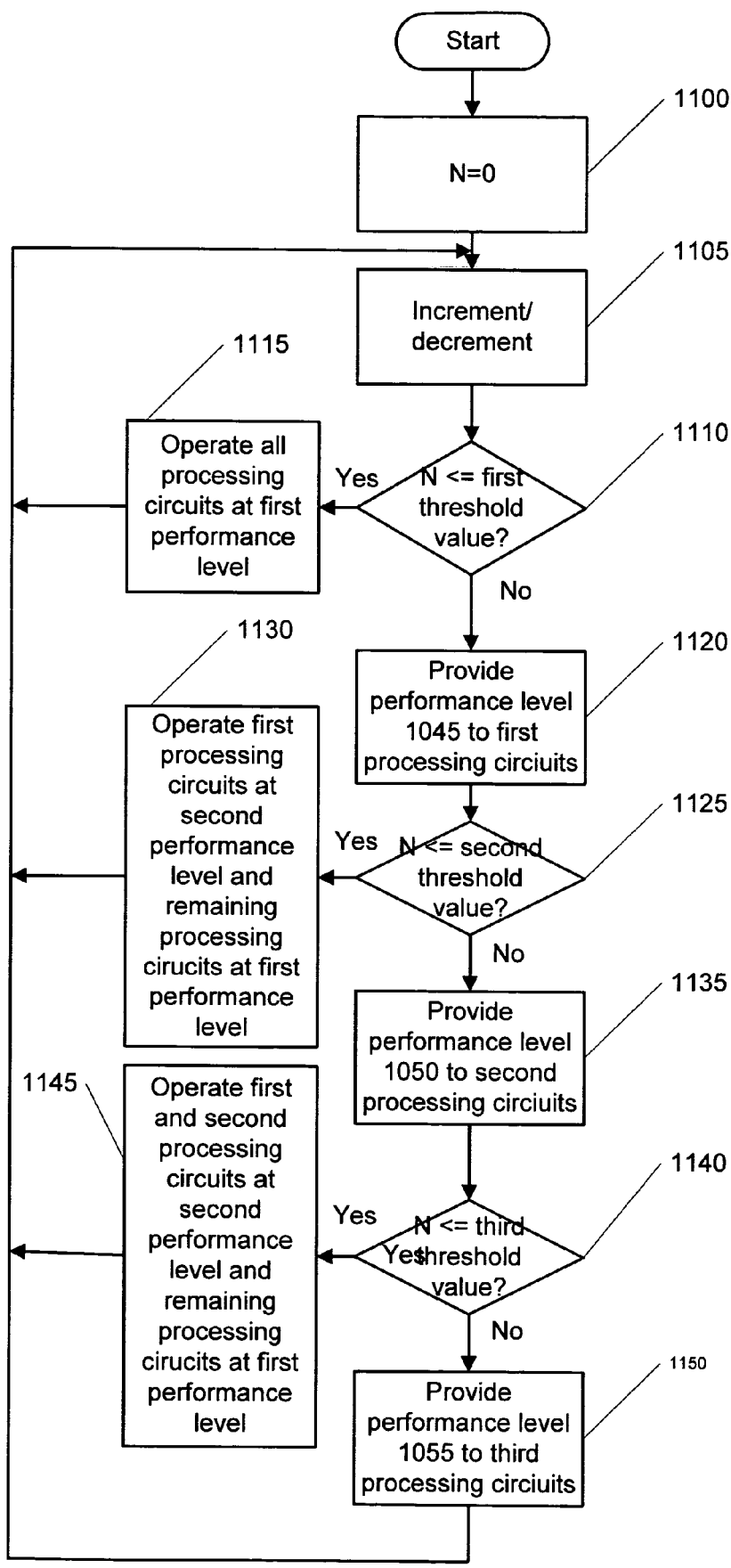
FIG. 11 is a flowchart that illustrates embodiments of a performance level control circuit according to the invention.

FIG. 11 is a flow chart which illustrates method embodiments of the performance level control circuit illustrated in FIG. 10. According to FIG. 11, the number of threads currently operating in the SMT processor is equal to zero when the SMT processor is initialized (Block 1100). As threads are created and are completed by the SMT processor, the number of threads currently operated by the SMT processor is incremented and decremented to provide the number, N, that represents the number of threads that are currently operated by the SMT processor (Block 1105).

If the number of threads currently operated by the SMT processor is less than or equal to the first threshold value (Block 1110), all processing circuits continue to operate at the first (or high) performance level (Block 1115). On the other hand, if the number of threads currently operated by the SMT processor exceeds the first threshold value (Block 1110), the processing circuits that are coupled to the performance level 1045 begin to operate at the second performance level (i.e., low power mode) (Block 1120).

If the number of threads currently operated by the SMT processor is less than or equal to a second threshold value (Block 1125), the processing circuits that are coupled to the performance level 1050 (and to the performance level 1055) begin to (or continue to) operate at the first performance level while the processing circuits coupled to the performance level 1045 (as discussed above) continue to operate at the second performance level (Block 1130).

If the number of threads currently operated by the SMT processor exceeds the second threshold value (Block 1125), the processing circuits coupled to the performance level 1050 begin to (or continue to) operate at the second performance level (Block 1135) along with the processing circuits coupled to the performance level 1045, whereas the processing circuits coupled to the performance level 1055 continue to operate at the first performance level.

If the number of threads currently operated by the SMT processor is less than or equal to a third threshold value (Block 1140), the processing circuits coupled to the performance level 1055 continue to operate at the first performance level whereas the processing circuits coupled to the performance level 1045 and the performance level 1050 continue to operate at the second performance level (Block 1145). If the number of threads currently operated by the SMT processor exceeds the third threshold value (Block 1140), the processing circuits coupled to the performance level 1055 begin to (or continue to) operate at the second performance level (i.e., in low power mode) (Block 1150).

As discussed above, embodiments according to the invention can provide processing circuits that are associated with the operation of threads in an SMT processor wherein the processing circuits are configured to operate at different performance levels based on a number of threads currently operated by the SMT processor. For example, in some embodiments according to the invention, processing circuits, such as a floating point unit or a data cache, that are associated with the operation of a thread in the SMT processor can operate in one of a high power mode or a low power mode based on the number of threads currently operated by the SMT processor.

Furthermore, as the number of threads operated by the SMT operator increases, the performance levels of the processing circuits can be decreased, thereby providing the architectural benefits of the SMT processor while allowing a reduction in the amount of power consumed by the processing circuits associated with the threads. For example, in some embodiments according to the invention, processing circuits according to the invention may operate at different clock speeds and/or use different circuit types (such different types of CMOS devices) to provided the different performance levels. For example, in some embodiments according to the invention, processing circuits, such as a floating point unit or a data cache, that are associated with the operation of a thread in the SMT processor can operate in one of a high power mode at a high clock speed or a low power mode at a lower clock speed based on the number of threads currently operated by the SMT processor.

Many alterations and modifications may be made by those having ordinary skill in the art, given the benefit of present disclosure, without departing from the spirit and scope of the invention. Therefore, it will be understood that the illustrated embodiments have been set forth only for the purposes of example, and that it should not be taken as limiting the invention as defined by the following claims. The following claims are, therefore, to be read to include not only the combination of elements which are literally set forth but all equivalent elements for performing substantially the same function in substantially the same way to obtain substantially the same result. The claims are thus to be understood to include what is specifically illustrated and described above, what is conceptually equivalent, and also what incorporates the essential idea of the invention.

What is claimed:

1. A Simultaneous Multi-Threading (SMT) processor comprising at least one processing circuit associated with operation of an SMT thread in the SMT processor and configured to operate at different performance levels based on a number of SMT threads currently operated by the SMT processor, wherein the at least one processing circuit is configured to operate at a first performance level when the number of SMT threads currently operated by the SMT processor is less than or equal to a threshold value; and
    wherein the at least one processing circuit is configured to operate at a second performance level when the number of SMT threads currently operated by the SMT processor is greater than the threshold value.

2. An SMT processor according to claim 1 further comprising:
    a performance level control circuit configured to provide a performance level for the at least one processing circuit based on the number of SMT threads currently operated by the SMT processor.

3. An SMT processor according to claim 2 wherein the performance level control circuit increases the performance level provided to the at least one processing circuit to a first performance level when the number of SMT threads currently operated by the SMT processor is less than or equal to a threshold value; and
    wherein the performance level control circuit decreases the performance level provided to the at least one processing circuit to a second performance level that is less than the first performance level when the number of SMT threads currently operated by the SMT processor exceeds the threshold value.

4. An SMT processor according to claim 3 wherein the threshold value comprises a first threshold value, wherein the performance level control circuit further decreases the performance level provided to the at least one processing circuit to a third performance level that is less than the second performance level, when the number of SMT threads currently operated by the SMT processor exceeds a second threshold value that is greater than the first threshold value.

5. An SMT processor according to claim 2 wherein the performance level control circuit is configured to increase or decrease the number of SMT threads currently operated by the SMT processor responsive to threads being created and completed, respectively, in the SMT processor.

6. An SMT processor according to claim 2 wherein the performance level control circuit is configured to decrease a performance level provided to the at least one processing circuit responsive to creation of a new SMT thread to increase the number of SMT threads currently operated by the SMT processor from less than or equal to a threshold value to greater than the threshold value.

7. An SMT processor according to claim 2 wherein the performance level control circuit is configured to reduce a performance level of the at least one processing circuit to one of a plurality of descending performance levels as the number of SMT threads currently operated by the SMT processor exceeds each of a plurality of ascending threshold values.

8. An SMT processor according to claim 1 wherein the at least one processing circuit comprises an integer register.

9. An SMT processor according to claim 1 wherein the at least one processing circuit comprises a first processing circuit configured to operate at a first performance level responsive to the number of SMT threads currently operated in the SMT processor being decreased to less than or equal to a threshold value, the SMT processor further comprising:
    a second processing circuit configured to operate at a second performance level that is less than the first performance level responsive to the number of SMT threads currently operated in the SMT processor being increased to greater than the threshold value.

10. A Simultaneous Multi-Threading (SMT) processor comprising at least one processing circuit associated with operation of a thread in the SMT processor and configured to operate at different performance levels based on a number of threads currently operated by the SMT processor;
    wherein the at least one processing circuit comprises a cache memory circuit including a tag memory and a data memory configured to provide cached data concurrent with an access to the tag memory when the cache memory circuit operates at a first performance level; and
    wherein the data memory is configured to provide cached data responsive to a hit in the tag memory when the cache memory circuit operates at a second performance level that is less than the first performance level.

11. An SMT processor according to claim 10 wherein the cache memory comprises at least one of a data cache memory configured to store data operated on by instructions and an instruction cache memory configured to store instructions that operate on associated data.

12. An SMT processor according to claim 10 wherein the data memory is further configured not to provide cached data responsive to a miss in the tag memory when operating at the second performance level.

13. A Simultaneous Multi-Threading (SMT) processor comprising at least one processing circuit associated with operation of a thread in the SMT processor and configured to operate at different performance levels based on a number of threads currently operated by the SMT processor, wherein the at least one processing circuit comprises a floating point unit including a first floating point unit configured to operate at a first performance level when the number of threads operated by the SMT processor is less than or equal to a threshold value, the SMT processor further comprising:
  a second floating point unit configured to operate at a second performance level, that is less than the first performance level, when the number of threads operated by the SMT processor is greater than the threshold value.

14. A Simultaneous Multi-Threading (SMT) processor comprising at least one processing circuit associated with operation of a thread in the SMT processor and configured to operate at different performance levels based on a number of threads currently operated by the SMT processor;
  a performance level control circuit configured to provide a performance level for the at least one processing circuit based on the number of threads currently operated by the SMT processor;
  wherein the performance level control circuit is configured to maintain a first performance level for a first processing circuit and to provide a second performance level, that is less than the first performance level, to a second processing circuit responsive to the number of threads currently operated by the SMT processor increasing from less than or equal to a threshold value to greater than the threshold value.

15. A Simultaneous Multi-Threading (SMT) Processor comprising:
  a performance level control circuit configured to provide a performance level to processing circuits in the SMT processor based on a number of SMT threads currently operated by the SMT processor, wherein the performance level control circuit is further configured to increase the number of SMT threads currently operated by the SMT processor responsive to creation of a new SMT thread to provide a new number of operating SMT threads and configured to provide a performance level to the processing circuits based on the new number of SMT threads operated by the SMT processor.

16. An SMT Processor according to claim 15 wherein the performance level control circuit is configured to increase the performance level provided to the processing circuits to a first performance level when the number of SMT threads currently operated by the SMT processor is less than or equal to a threshold value; and
  wherein the performance level control circuit decreases the performance level provided to the processing circuits to a second performance level that is less than the first performance level when the number of SMT threads currently operated by the SMT processor exceeds the threshold value.

17. An SMT Processor according to claim 15 wherein the processing circuit comprises at least one of a floating point unit and a data cache memory.

18. An SMT processor according to claim 15 wherein the processing circuits are configured to operate at a first performance level when the number of SMT threads currently operated by the SMT processor is less than or equal to a threshold value; and
  wherein the processing circuits are configured to operate at a second performance level when the number of SMT threads currently operated by the SMT processor is greater than the threshold value.

19. An SMT processor according to claim 18 wherein the performance level control circuit is configured to reduce the performance level provided to the processing circuits to one of a plurality of descending performance levels as the number of SMT threads currently operated by the SMT processor exceeds each of a plurality of ascending threshold values.

20. A Simultaneous Multi-Threading (SMT) Processor comprising:
  a performance level control circuit configured to provide a performance level to processing circuits in the SMT processor based on a number of threads currently operated by the SMT processor;
  wherein the performance level control circuit is further configured to increase the number of threads currently operated by the SMT processor responsive to creation of a new thread to provide a new number of operating threads and configured to provide a performance level to the processing circuits based on the new number of threads operated by the SMT processor;
  wherein the performance level control circuit is further configured to maintain the first performance level for a first processing circuit and to provide a second performance level, that is less than the first performance level, to a second processing circuit responsive to the number of threads currently operated by the SMT processor increasing from less than or equal to a threshold value to greater than the threshold value.

21. A Simultaneous Multi-Threading (SMT) Processor comprising:
  a thread management circuit configured to assign processing circuits associated with the SMT processor to SMT threads operated in the SMT processor as the SMT threads are created; and
  a performance level control circuit configured to provide one of a plurality of performance levels to the processing circuits based on a number of SMT threads currently operated by the SMT processor compared to at least one threshold value, wherein the performance level control circuit increases a performance level provided to the processing circuits to a first performance level when the number of SMT threads currently operated by the SMT processor is less than or equal to the at least one threshold value; and
  wherein the performance level control circuit decreases the performance level provided to the processing circuits to a second performance level that is less than the first performance level when the number of SMT threads currently operated by the SMT processor exceeds the at least one threshold value.

22. An SMT processor according to claim 21 wherein the at least one threshold value comprises a threshold number of threads operated by the SMT processor.

23. An SMT processor according to claim 21 wherein the performance level control circuit is configured to decrease a performance level provided to the processing circuits responsive to creation of a new SMT thread to increase the number of SMT threads currently operated by the SMT processor from less than or equal to the at least one threshold value to greater than the at least one threshold value.

24. A Simultaneous Multi-Threading (SMT) Processor comprising:
a thread management circuit configured to assign processing circuits associated with the SMT processor to threads operated in the SMT processor as the threads are created; and
a performance level control circuit configured to provide one of a plurality of performance levels to the processing circuits based on a number of SMT threads currently operated by the SMT processor compared to at least one threshold value;
wherein the performance level control circuit is configured to maintain a first performance level for a first processing circuit and to provide a second performance level, that is less than the first performance level, to a second processing circuit responsive to the number of threads currently operated by the SMT processor increasing from less than or equal to the at least one threshold value to greater than the at least one threshold value.

25. A method of operating a Simultaneous Multi-Threading (SMT) processor comprising:
providing a performance level to at least one processing circuit based on a number of SMT threads currently operated by the SMT processor,
wherein the step of providing is preceded by:
comparing the number of threads currently operated by the SMT processor and a threshold value to provide the performance level to the at least one processing circuit;
wherein the step of comparing is preceded by:
incrementing the number of threads currently operated by the SMT processor responsive to a new thread being started in the SMT processor; and
decrementing the number of threads currently operated by the SMT processor responsive to a thread being terminated in the SMT processor;
wherein the step of providing comprises:
providing a first performance level to the at least one processing circuit if the number of threads currently operated by the SMT processor is less than or equal to the threshold value; and
providing a second performance level, that is less than the first performance level, to the at least one processing circuit if the number of threads currently operated by the SMT processor exceeds the threshold value.

26. A method according to claim 25 further comprising:
providing further decreasing performance levels to processing circuits associated with new SMT threads that increase the number of SMT threads currently operated by the SMT processor to exceed increasing additional threshold values.

27. A Simultaneous Multi-Threading (SMT) processor comprising:
means for providing a performance level to at least one processing circuit based on a number of SMT threads currently operated by the SMT processor;
means for incrementing the number of SMT threads currently operated by the SMT processor responsive to a new SMT thread being started in the SMT processor; and
means for decrementing the number of SMT threads currently operated by the SMT processor responsive to an SMT thread being terminated in the SMT processor;
wherein the means for providing comprises:

means for providing a first performance level to the at least one processing circuit if the number of SMT threads currently operated by the SMT processor is less than or equal to a threshold value; and
means for providing a second performance level, that is less than the first performance level, to the at least one processing circuit if the number of SMT threads currently operated by the SMT processor exceeds the threshold value.

28. An SMT according to claim 27 further comprising:
means for comparing the number of SMT threads currently operated by the SMT processor and a threshold value to provide the performance level to the at least one processing circuit.

29. An SMT according to claim 28 further comprising:
means for providing further decreasing performance levels to processing circuits associated with new SMT threads that increase the number of SMT threads currently operated by the SMT processor to exceed increasing additional threshold values.

30. A computer program product for operating a Simultaneous Multi-Threading (SMT) processor comprising:
a computer readable medium having computer readable program code embodied therein, the computer readable program product comprising:
computer readable program code configured to provide a performance level to at least one processing circuit in the SMT processor based on a number of SMT threads currently operated by the SMT processor;
wherein the computer readable program code configured to provide comprises;
computer readable program code configured to provide a first performance level to the at least one processing circuit if the number of threads currently operated by the SMT processor is less than or equal to the threshold value; and
computer readable program code configured to provide a second performance level, that is less than the first performance level, to the at least one processing circuit if the number of threads currently operated by the SMT processor exceeds the threshold value.

31. A computer program product according to claim 30 further comprising:
computer readable program code configured to compare the number of SMT threads currently operated by the SMT processor and a threshold value to provide the performance level to the at least one processing circuit.

32. A computer program product according to claim 30 further comprising:
computer readable program code configured to increment the number of SMT threads currently operated by the SMT processor responsive to a new SMT thread being started in the SMT processor; and
computer readable program code configured to decrement the number of SMT threads currently operated by the SMT processor responsive to an SMT thread being terminated in the SMT processor.

33. A computer program product according to claim 31 further comprising:
computer readable program code configured to provide further decreasing performance levels to processing circuits associated with new SMT threads that increase the number of SMT threads currently operated by the SMT processor to exceed increasing additional threshold values.

34. A Simultaneous Multi-Threading (SMT) processor comprising at least one processing circuit associated with operation of a thread in the SMT processor and configured to operate at lower performance levels as a number of threads currently operated by the SMT processor increases.

35. An SMT processor according to claim 34 wherein the at least one processing circuit is further configured to operate at higher performance levels as the number of threads currently operated by the SMT processor decreases.

36. An SMT processor according to claim 34 wherein the SMT processor comprises a single SMT processor chip.

37. An SMT processor according to claim 34 wherein the number of threads currently operated by the SMT processor comprise active threads.

* * * * *

UNITED STATES PATENT AND TRADEMARK OFFICE
CERTIFICATE OF CORRECTION

| | |
|---|---|
| PATENT NO. | : 7,152,170 B2 |
| APPLICATION NO. | : 10/631601 |
| DATED | : December 19, 2006 |
| INVENTOR(S) | : Gi-ho Park |

It is certified that error appears in the above-identified patent and that said Letters Patent is hereby corrected as shown below:

On Title Page, Item (56), <u>OTHER PUBLICATIONS</u>, should include the following:

--Lo et al.; "Software-Directed Register Deallocation for Simultaneous Multithreaded Processors," *IEEE Transactions on Parallel and Distributed Systems, 10(9):922-933 (1999)*

<u>Col. 18, lines 58-65</u>

Missing Claim 33: --A method according to Claim 25 wherein the step of providing is preceded by: Comparing the number of SMT threads currently operated by the SMT processor and a threshold value to provide the performance level to the at least one processing circuit. --

<u>Column 14</u>
Line 15: Change "level, when" to read --level when--

<u>Column 17</u>
Line 33: Change "number of threads" to read --number of SMT threads--

Line 47: Change "number of threads" to read --number of SMT threads--

UNITED STATES PATENT AND TRADEMARK OFFICE
CERTIFICATE OF CORRECTION

| | | |
|---|---|---|
| PATENT NO. | : 7,152,170 B2 | |
| APPLICATION NO. | : 10/631601 | |
| DATED | : December 19, 2006 | |
| INVENTOR(S) | : Gi-ho Park | |

It is certified that error appears in the above-identified patent and that said Letters Patent is hereby corrected as shown below:

<u>Column 18</u>
Line 31: Change "comprises;" to read --comprises:--

Signed and Sealed this

Fourth Day of September, 2007

JON W. DUDAS
*Director of the United States Patent and Trademark Office*